United States Patent
Brown

(10) Patent No.: US 8,278,860 B2
(45) Date of Patent: Oct. 2, 2012

(54) VARIABLE PULSE WIDTH MODULATION FOR REDUCED ZERO-CROSSING GRANULARITY IN SENSORLESS BRUSHLESS DIRECT CURRENT MOTORS

(75) Inventor: Ward R. Brown, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 362 days.

(21) Appl. No.: 12/767,101

(22) Filed: Apr. 26, 2010

(65) Prior Publication Data

US 2011/0084640 A1    Apr. 14, 2011

Related U.S. Application Data

(60) Provisional application No. 61/249,793, filed on Oct. 8, 2009.

(51) Int. Cl.
*H02P 6/00* (2006.01)

(52) U.S. Cl. ............... 318/400.35; 318/400.01; 318/599; 318/606

(58) Field of Classification Search ............. 318/400.01, 318/400.35, 599, 606; 363/25, 26, 40, 41
See application file for complete search history.

(56) References Cited

U.S. PATENT DOCUMENTS

| | | | | |
|---|---|---|---|---|
| 6,534,938 B1 * | 3/2003 | Wu et al. | ................... | 318/400.28 |
| 7,592,761 B2 * | 9/2009 | MacKay | .................... | 318/254.1 |
| 7,626,350 B2 * | 12/2009 | Mori et al. | ..................... | 318/432 |
| 2003/0062860 A1 | 4/2003 | Wu et al. | ........................ | 318/254 |

FOREIGN PATENT DOCUMENTS

EP    1482632 A2    12/2004

OTHER PUBLICATIONS

Brown, Ward, "Brushless DC Motor Control Made Easy", Microcip Technology Inc., AN857, 48 pages, Sep. 12, 2002.
Yedamale, Padmaraja, "Brushless DC (BLDC) Motor Fundamentals", Microchip Technology Inc., AN885, 20 pages, Nov. 11, 2003.
Lepkowski, Jim "Motor Control Feedback Circuits", Microchip Technology Inc., AN894, 18 pages, Dec. 31, 2003.
Yedamale, Padmaraja, "Using the PIC18F2431 for Sensorless BLDC Motor Control", Microchip Technology Inc., AN970; 18 pages, Feb. 7, 2005.
International PCT Search Report, PCT/US2010/051444, 12 pages, Mar. 30, 2011.

* cited by examiner

*Primary Examiner* — Rita Leykin
(74) *Attorney, Agent, or Firm* — King & Spalding L.L.P.

(57) ABSTRACT

Zero-crossing detection accuracy is enhanced in a sensorless brushless direct current (BLDC) motor by increasing the PWM drive frequency in anticipation of a zero-crossing event in any one or more commutation periods. Once a zero-crossing event is detected, the PWM frequency can go back to a lower normal operating frequency. Switching losses of the power drive transistors are thereby minimized while maintaining accurate zero-crossing detection for stable operation of the BLDC motor.

13 Claims, 5 Drawing Sheets

VARIABLE PULSE WIDTH MODULATION FOR REDUCED ZERO-CROSSING GRANULARITY IN SENSORLESS BRUSHLESS DIRECT CURRENT MOTORS

RELATED PATENT APPLICATION

This application claims priority to commonly owned U.S. Provisional Patent Application Ser. No. 61/249,793; filed Oct. 8, 2009; entitled "Variable Pulse Width Modulation for Reduced Zero-Crossing Granularity in Sensorless Brushless Direct Current Motors," by Ward R. Brown and is related to commonly owned U.S. patent application Ser. No. 12/767,052; filed Apr. 26, 2010; entitled "Synchronized Minimum Frequency Pulse Width Modulation Drive for Sensorless Brushless Direct Current Motor," by Ward R. Brown; and U.S. patent application Ser. No. 12/767,017; filed Apr. 26, 2010; entitled "Slow Speed Operation of Brushless Direct Current Motors by Gating Pulse Width Modulation Drive," by Ward R. Brown; wherein all are hereby incorporated by reference herein for all purposes.

TECHNICAL FIELD

The present disclosure relates to sensorless brushless direct current (BLDC) motors, and more particularly, to using variable pulse width modulation (PWM) for reduced zero-crossing detection granularity when driving a sensorless BLDC motor.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. More detailed information on BLDC motors may be found in Microchip Application Notes: AN857, entitled "Brushless DC Motor Control Made Easy," (2002); AN885, entitled "Brushless DC (BLDC) Motor Fundamentals," (2003); AN894, entitled "Motor Control Sensor Feedback Circuits," (2003); AN901, entitled "Using the dsPIC30F for Sensorless BLDC Control," (2004); and AN970, entitled "Using the PIC18F2431 for Sensorless BLDC Motor Control," (2005); all are hereby incorporated by reference herein for all purposes.

A three-phase BLDC motor completes an electrical cycle, i.e., 360 electrical degrees of rotation, in six steps at 60 electrical degrees per step. Synchronously at every 60 electrical degrees, phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs. For example, a four-pole BLDC motor will require two electrical cycles to complete one mechanical revolution of the motor rotor (see FIG. 3).

Drive commutation for a BLDC motor may be determined by monitoring the back electromotive force (EMF) voltages at each phase (A-B-C) of the motor. The drive commutation is synchronized with the motor when the back EMF of the un-driven phase crosses one-half of the motor supply voltage during a commutation period. This is referred to as "zero-crossing" where the back EMF varies above and below the zero-crossing voltage over each electrical cycle. Zero-crossing is detected on the un-driven phase when the drive voltage is being applied to the driven phases. A voltage polarity change about the zero-crossing voltage of the back EMF on the un-driven phase may also be used in detecting a zero-crossing event, e.g., from positive to negative or negative to positive during application of the drive voltage to the driven phases within certain limits.

When driving sensorless brushless DC motors, large gaps occur in the drive voltage at high motor rotational speeds and 50% or less PWM duty cycle. The PWM drive control algorithm becomes unstable when the uncertainty of zero-crossing detection reaches about 20%. Gaps in drive voltage create timing errors in the zero-crossing detection, and high PWM frequencies are inefficient and lead to power field effect transistor (FET) failures due to overheating of the FET power driver.

Drive commutation is synchronized with the sensorless BLDC motor when the back electromotive force (BEMF) of the un-driven phase crosses half the motor supply voltage in the middle of the commutation period. This is sometimes referred to as zero-crossing. Zero-crossing is only valid when the drive voltage is applied to the other two phases. Drive voltage is varied by pulse width modulating the full drive voltage. Therefore, during PWM drive off periods zero-crossing cannot be detected. When the PWM frequency is low and the motor speed is high, the low (off) PWM periods can be a significant percentage of the commutation period and thereby may cause a gap in the zero-crossing detection. When these gaps are more than 20 percent of the commutation period they will cause instability in the control algorithm. The gap percentage can be reduced by increasing the PWM frequency at the expense of increased and undesirable switching losses.

SUMMARY

The aforementioned problems are solved, and other and further benefits achieved by increasing the PWM frequency for only a short time in anticipation of when a "zero-crossing" should occur, the efficiency of the lower average PWM frequency can still be maintained while gaining the advantage of better zero-crossing detection resolution. Increasing the PWM frequency for a short time in anticipation of the zero-crossing event will improve detection resolution thereof.

Prior technologies measured the zero-crossing voltage with a fast analog-to-digital converter (ADC). This requires a stable drive period while the ADC voltage capture is being made (voltage sample taken). These prior technology solutions force the motor drive on during an ADC voltage capture. However, by using a comparator to detect the zero-crossing event, a stable voltage capture is not required and is instead replaced with an event occurring immediately upon the back electromotive force (BEMF) voltage rising above (or below) the zero-crossing threshold, according to the teachings of this disclosure.

According to a specific example embodiment of this disclosure, a method for improving zero-crossing detection in a sensorless brushless direct current motor comprises the steps of: generating a first plurality of pulse width modulation (PWM) control pulses at a first number of pulses per second until a certain time interval before a zero-crossing event is anticipated then generating a second plurality of PWM control pulses at a second number of pulses per second, wherein the second plurality of PWM control pulses at the second number of pulses per second is greater than the first plurality of PWM control pulses at the first number of pulses per second; detecting a zero-crossing event during the generation of the second plurality of PWM control pulses at the second number of pulses per second in at least one commutation period of an electrical cycle of a sensorless brushless direct current motor by measuring a back electromotive force voltage at an unexcited phase connection of the sensorless brushless direct current motor; and returning to generating the first plurality of PWM control pulses at the first number of pulses per second after the zero-crossing event has been detected.

According to another specific example embodiment of this disclosure, a method for improving zero-crossing detection in a sensorless brushless direct current motor comprises the steps of: generating a plurality of pulse width modulation (PWM) pulses at a first number of pulses per second until a certain time interval before a zero-crossing event is anticipated then generating the plurality of PWM pulses at a second number of pulses per second, wherein the second number of pulses per second is greater than the first number of pulses per second; determining electrical timing centers for each of a plurality of commutation periods of a sensorless brushless direct current motor by measuring back electromotive force voltages at each stator coil of the sensorless brushless direct current motor, and determining from the measured back electromotive force voltages when each of the measured back electromotive force voltages is at substantially a zero-crossing voltage value, wherein the zero-crossing voltage value is about one-half of a voltage value of a direct current power source; and driving power switching transistors with the plurality of PWM pulses during the plurality commutation periods, wherein the power switching transistors are connected between the stator coils of the sensorless brushless direct current motor and the direct current power source.

BRIEF DESCRIPTION OF THE DRAWINGS

A more complete understanding of the present disclosure thereof may be acquired by referring to the following description taken in conjunction with the accompanying drawings wherein.

Figure 1:
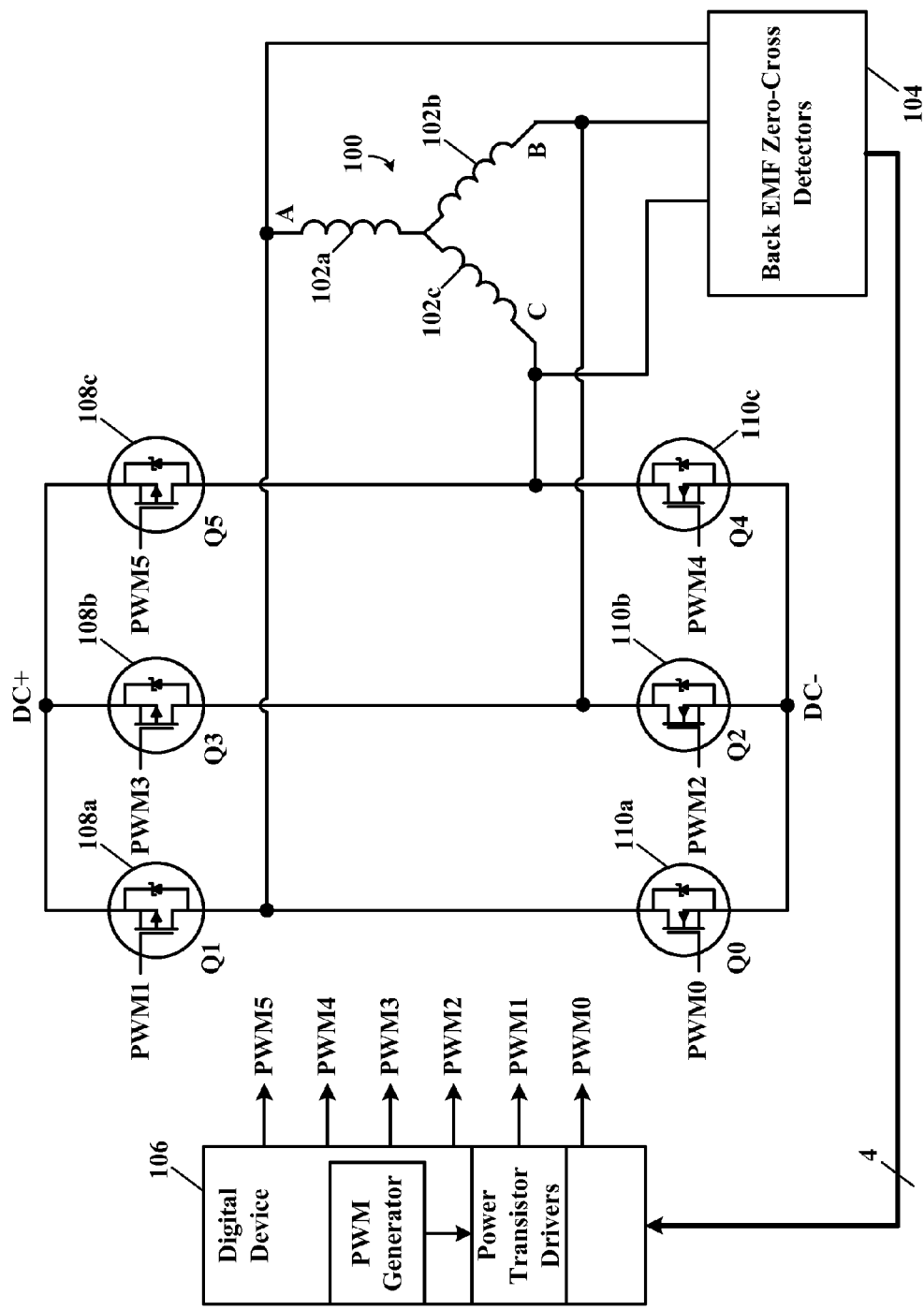
FIG. 1 illustrates a schematic diagram of a three-phase sensorless brushless direct current motor and electronically commutating motor controller, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic diagram of a three-phase sensorless brushless direct current motor and electronically commutating motor controller, according to a specific example embodiment of this disclosure. A three-phase sensorless brushless direct current motor, generally represented by the numeral 100, comprises a plurality of stator coils 102 and a rotor (not shown) having magnets arranged in a three-phase configuration. For discussion purposes the motor 100 described herein will be in a two pole three-phase configuration requiring 360 degrees of electrical rotation to produce one mechanical revolution of 360 degrees. The motor 100 is electronically commutated with power switching transistors 108 and 110 connected to the three-phase sensorless brushless direct current motor 100 and a direct current (DC) power source. Back electromotive force (EMF) zero-cross detectors 104 and a digital device 106, e.g., a microcontroller, having PWM generators that provide pulse width modulation (PWM) outputs coupled to power transistor drivers. The power transistor drivers (PWM0-PWM5) control turn-on and turn-off of the power switching transistors 108 and 110.

The motor 100 is electronically commutated from a direct current (DC) source (not shown) through the power switching power transistors 108 and 110, e.g., power field effect transistors (one pair per phase for a three-phase motor). The power transistors 108 and 110 are controlled by the digital device 106, e.g., a microcontroller, that is coupled to the power transistors 108 and 110 through drivers for the power transistors (not shown). The digital device 106 provides six pulse width modulation (PWM) outputs, PWM0-PWM5, that control both the motor rotation direction and speed by turning on and off selected phase pairs of the power transistors 108 and 110 according to PWM signals appropriately sequenced and timed.

Each stator coil 102 is connected to the positive of the DC power source for two commutation periods, the negative of the DC power source for two commutation periods, and is disconnected from both the positive and negative of the DC power source for two commutation periods. The motor phase position is determined by back electromotive force (EMF) voltages measured at a stator coil 102 when not connected to the DC power source at the time of measurement while the other two stator coils 102 are connected to the DC power source. The back EMF voltages at each of the stator coils 102 are monitored by the back EMF zero-cross detectors 104 (one per phase). However, the back EMF voltage to be measured requires connection to the positive of the DC power source of one of the stator coils 102 so as to enable current flow therethrough, thereby biasing the motor generated voltage to a level centered around the detection reference level ("zero-crossing" event), e.g., one-half the supply voltage. The other stator coil 102 of the pair of coils having current flow therethrough is connected to the negative of the DC power source.

Figure 2:
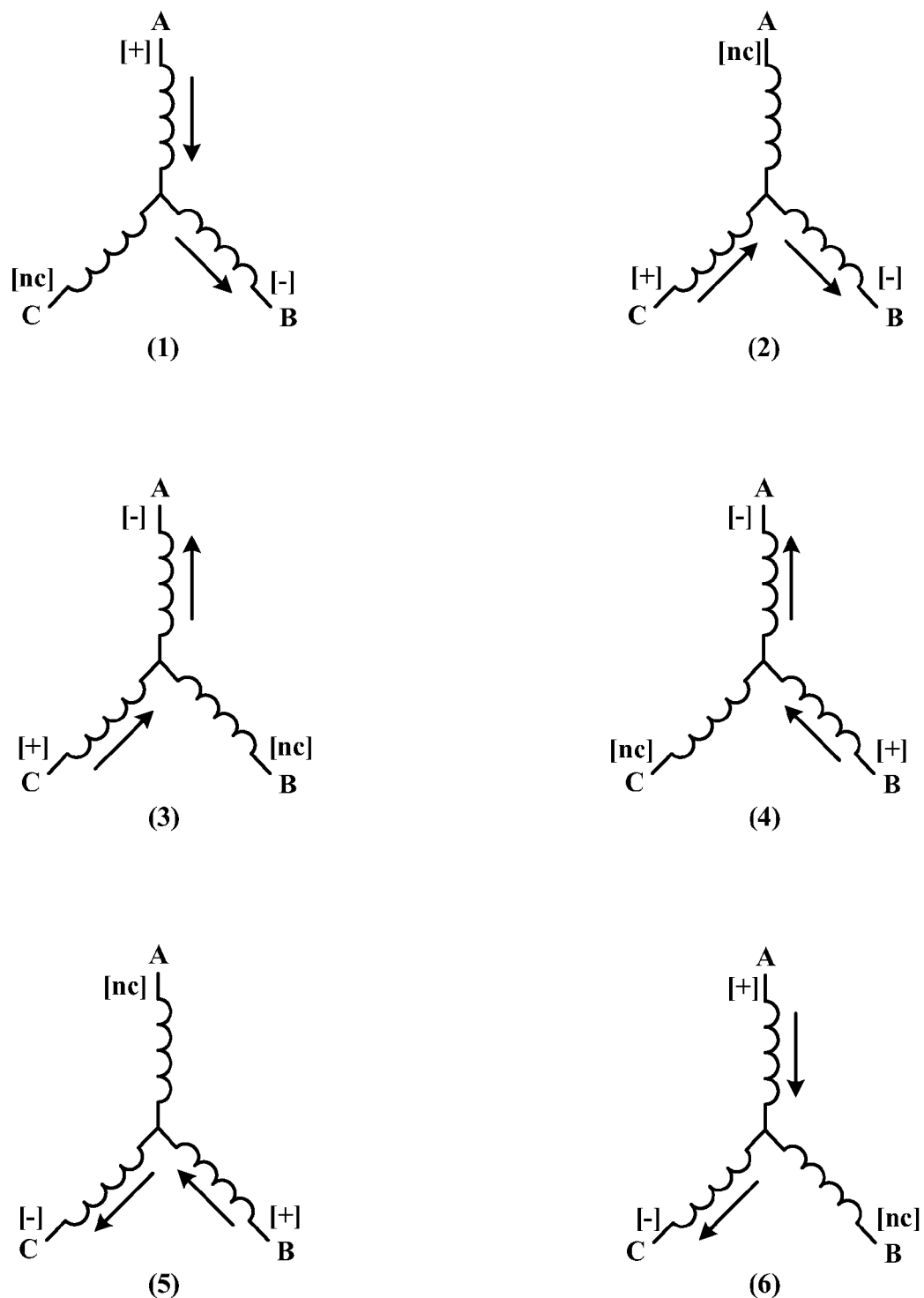
FIG. 2 illustrates schematic diagrams showing current flows in each of the three stator windings of a three-phase sensorless brushless direct current motor during each 60 degree commutation period.

Referring to FIG. 2, depicted are schematic diagrams showing current flows in each of the three stator windings (coils 102) of a three-phase sensorless brushless direct current motor during each 60 degree commutation period. Rotation of the motor 100 is divided into six commutation periods (1) through (6), and current flows through different combinations of two of the three coils 102 during each of the six commutation periods. While combinations of two of the coils 102 are connected to the DC power source, a third coil 102 (three-phase motor) is not connected to the power source. However the unconnected coil 102 is monitored by the back EMF zero-cross detectors 104 such that upon detection of a "zero crossing" event, i.e., back EMF voltage on the unconnected coil 102 changes polarity while going through a substantially zero voltage ("zero voltage" is defined herein as one-half of the DC supply voltage). At approximately the zero voltage point detected by a respective one of the back EMF zero-cross detectors 104, a synchronization relationship of the motor 100 stator coils 102 is ascertained, as more fully described hereinbelow.

Figure 3:
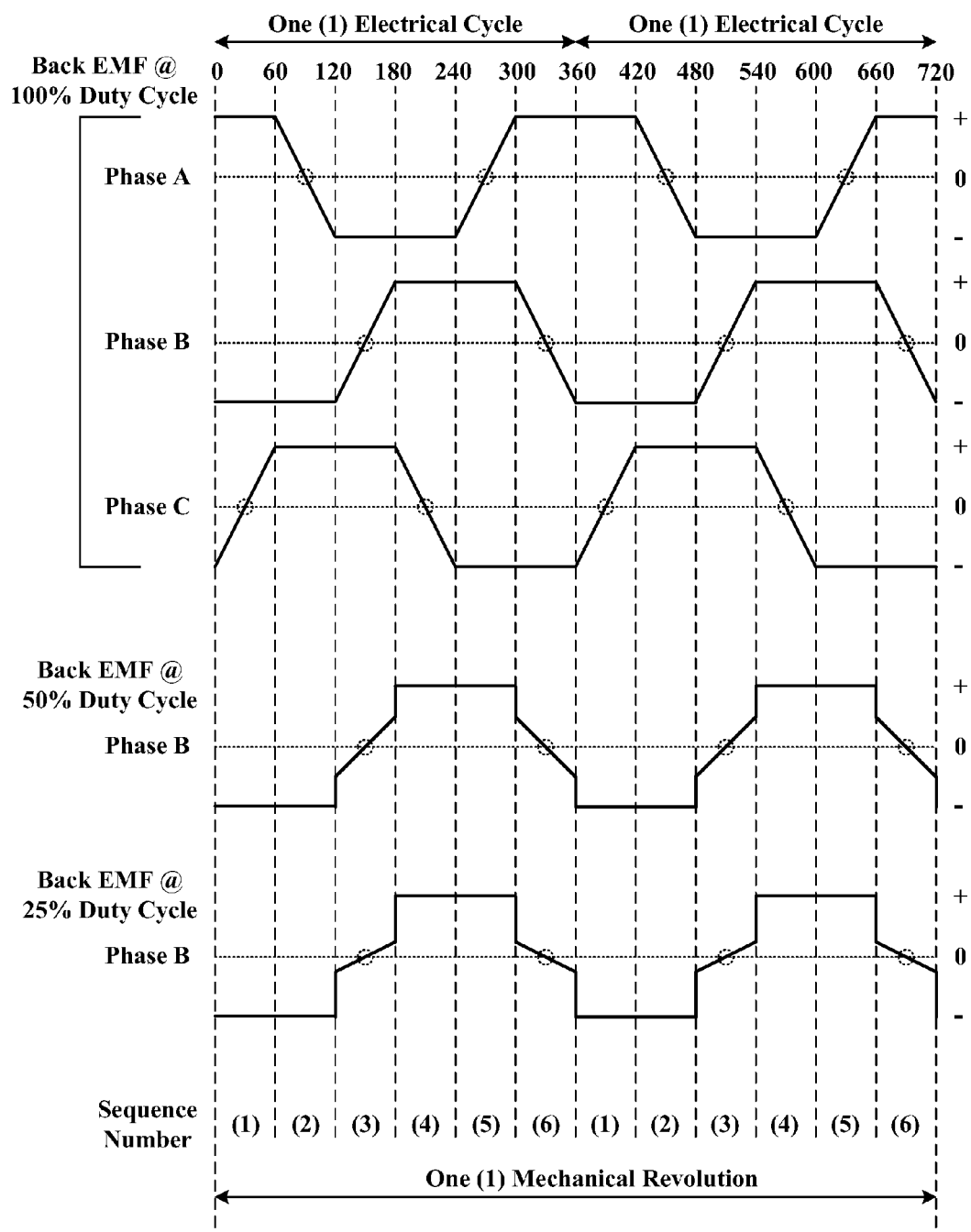
FIG. 3 illustrates schematic timing and amplitude graphs of a four-pole motor showing back electromotive force (EMF) voltages at each of the three stator windings during each 60 degree commutation period.

Referring to FIG. 3, depicted are schematic timing and amplitude graphs of a four-pole motor showing back electromotive force (EMF) voltages at each of the three stator windings during each 60 degree commutation period. When a phase coil is not connected to the DC power source no current flows therethrough. When a phase coil is connected to the positive (DC+) power source, current flows in a positive direction for two commutation periods (120 electrical degrees), then no current flows (coil is unconnected from the DC power source) for a subsequent commutation period (60 electrical degrees), and after the unconnected commutation period the very same coil has current flow in a negative direction for two commutation periods (120 electrical degrees) when connected to the negative (DC−) power source, and then no current flows in a next commutation period (60 electrical degrees) before the aforementioned electrical cycle repeats, i.e., for another 360 degree electrical cycle.

When using a sensorless BLDC motor, the back EMF voltage on the unconnected coil is transitioning from the positively driven polarity to the negatively driven polarity and does so throughout the 60 degree period when not being connected. If current is initially going into the coil when the connection is broken then the current will continue to flow thereby forward biasing a diode in parallel with the low-side drive transistor 110 presenting a voltage on the motor coil terminal equal to the negative (DC−) power source voltage plus the forward bias voltage of the diode. This negative spike persists until the energy in the coil is dissipated.

A "zero crossing" is where the measured voltage at each phase coil 102 goes to substantially one-half of the DC supply voltage (in the graphs normalized to "zero"), and is illustrated by the small circles of the back EMF graphs. When the PWM duty cycle is 100% in a commutation period, the measured back EMF varies between the full positive (DC+) rail voltage and the full negative (DC−) rail voltage of the power source. When the PWM duty cycle is 50% in a commutation period, the measured back EMF varies between 50% (one-half) of the full positive (DC+) rail voltage and 50% (one-half) of the full negative (DC−) rail voltage of the power source. When the PWM duty cycle is 25% in a commutation period, the measured back EMF varies between 25% (one-half) of the full positive (DC+) rail voltage and 25% (one-half) of the full negative (DC−) rail voltage of the power source. Therefore there is a direct correlation between the PWM duty cycle applied to the two current carrying coils 102 and the measured back EMF on the unconnected coil 102. However, the back EMF always passes through the "zero crossing" point at substantially the center (e.g., middle, half-way point) of a commutation period when the other two coils are excited (current flowing therethrough). Just at lower PWM duty cycles, there is less variation of the back EMF voltage in the commutation period. This is not problematic since the "zero crossing" point is what is of interest.

It is important to remember that back EMF on the unconnected coil 102 is biased properly for detection only when the other two coils 102 are connected to the positive (DC+) and negative (DC−) power source rails and current flows through them. If there is no current flow in the two connected coils 102 at the time when a "zero crossing" should occur then the back EMF voltage at the unconnected coil 102 will not be centered relative to the reference voltage, and detection of the exact "zero crossing" will not be possible. However, missing detection of the exact "zero crossing" point in time because power drive is off (no current flow) at the instant of exact zero crossing may not be fatal so long as a change in polarity, e.g., positive to negative or visa versa, of the back EMF is determined when the power drive returns soon after zero crossing, and that this occurs close enough in time (electrical degrees) so as not to cause too great of a commutation timing error in normal operation. Instability problems do result when low duty cycle PWM signals cause significant commutation timing errors. As illustrated in the back EMF graphs shown in FIG. 5, "zero crossing" points occur at approximately 30 electrical degrees from a commutation period change, i.e., substantially in the center (middle) of a commutation period.

Figure 4:
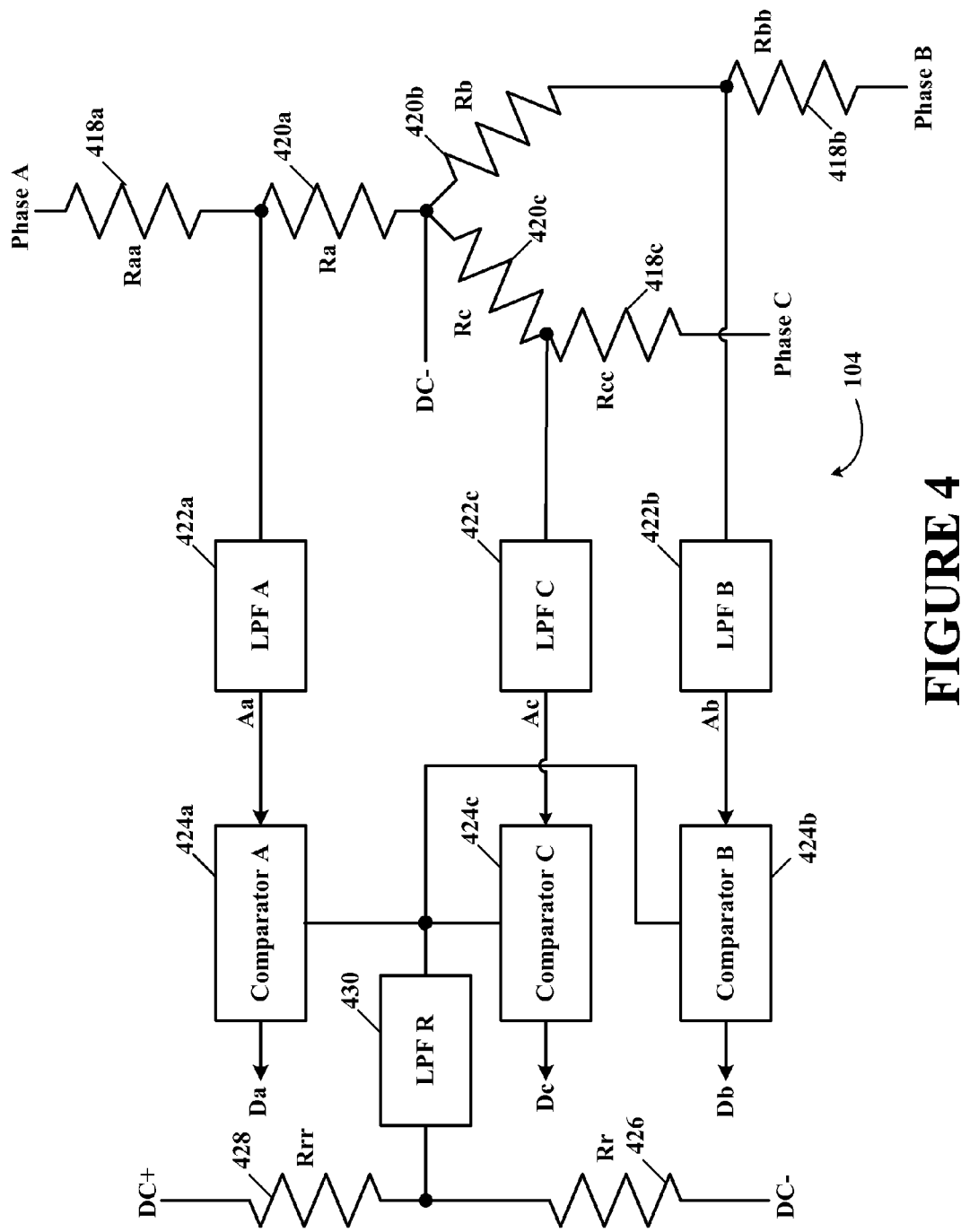
FIG. 4 illustrates a more detailed schematic diagram of the back EMF zero-cross detectors shown in FIG. 1.

Referring to FIG. 4, depicted is a more detailed schematic block diagram of the back EMF zero-cross detectors shown in FIG. 1. The back EMF zero-cross detectors 204 may comprise three-phase voltage divider resistors 418 and 420, phase low-pass filters 422, reference low-pass filter 430, reference voltage divider resistors 426 and 428, and voltage comparators 424. The reference voltage divider resistors 426 and 428 are used to derive a "virtual" neutral reference voltage for use by the comparators 424 and/or the digital device 106 having analog inputs. The three-phase voltage divider resistors 418 and 420 reduce the stator coils 102 voltages to much lower voltages for use by the low-pass filters 422 and comparators 424. Preferred resistance relationships for the resistors 418, 420, 426 and 428 are as follows:

$$Raa=Rbb=Rcc=Rrr$$

$$Ra=Rb=Rc=2*Rr$$

$$Ra/(Raa+Ra)=V\text{comparator\_maximum\_input}/((DC+)-(DC-))$$

The low pass filters 422 may be used to substantially reduce unwanted noise from the inputs to the comparators 424. The comparators 424 are used in determining when a back EMF voltage on an unconnected coil 102 is greater than the neutral reference voltage, or less than or equal to the neutral reference voltage. The outputs of the comparators 424 when at a logic high ("1") may represent that the back EMF voltage is greater than the neutral reference voltage, and when at a logic low ("0") may represent that the back EMF voltage is less than or equal to the neutral reference voltage, or visa-versa (designer's choice). The outputs of each of the comparators 424 may thereby be used to indicate when the back EMF voltage is at its "zero" transition point or when a back EMF polarity transition occurs, and indicate same to the digital device 106. If the digital device has analog inputs and analog-to-digital (ADC) conversion capabilities and/or voltage comparators, the external comparators may not be required. When this is the case, the outputs from the low pass filters and the neutral reference voltage from the resistors 426 and 428 may be connected directly to the analog inputs (not shown) of the digital device 106 (e.g., mixed signal device).

Figure 5:
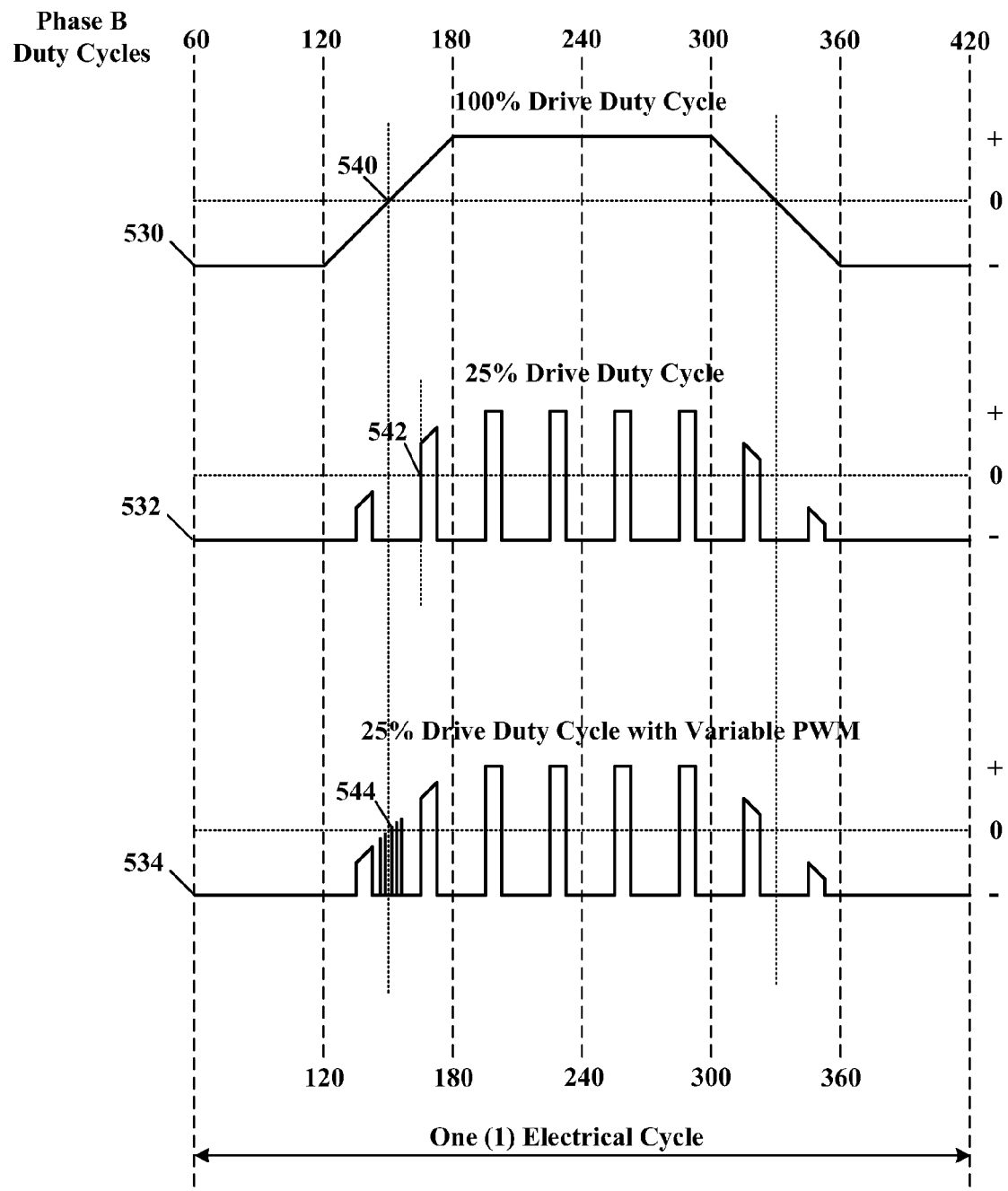
FIG. 5 illustrates schematic amplitude and timing graphs of voltages at one phase of the sensorless BLDC motor during each commutation period for different PWM duty cycles, according to the teachings of this disclosure.

Referring to FIG. 5, depicted are schematic amplitude and timing graphs of voltages at one phase of the sensorless BLDC motor during each commutation period for different PWM duty cycles, according to the teachings of this disclosure. The BLDC motor operates at rotational speeds that are dependent upon the average voltages on each stator coil 102 during appropriate 60 degree commutation periods. Direction of rotation of the motor 100 is dependent upon the commutation connection order of the coils 102 to the DC power source over each (360 degree) electrical cycle.

The graphs shown in FIG. 5 depict a high side modulated system (only the appropriate high side FET 108 is modulated). The zero-crossing comparator reference is set to the virtual zero level (Vsupply/2) depicted as 0 (see FIG. 4). On the rising BEMF side points 540, 542, and 544 are the first instances where the BEMF voltage crosses the reference, thereby giving a comparator output transition. On the falling BEMF side, for duty cycles less than 100 percent, the BEMF crosses 0 at every modulation off-on and on-off transition, all of which occur before the actual zero-crossing event.

Graph 530 represents a 100 percent PWM drive duty cycle over one electrical cycle at one phase of the motor 100. The 100 percent duty cycle will result in maximum voltages resulting in maximum rotational speed of the motor 100. Detection of "zero-crossing" point 540 is always accurate because back EMF is always present on the unconnected coil 102 because the two connected coils 102 have current flow over the entire commutation period.

Graph 532 represents approximately a 25 percent PWM drive duty cycle over one electrical cycle at one phase of the motor 100. For such low duty cycles during the commutation periods, back EMF is only present on the unconnected coil 102 for 25 percent of the commutation period. As such, if the "zero-crossing" point occurs when there is no excitation on the connected coils 102, then detection of the back EMF can only be accomplished when the measured back EMF goes from negative to positive during the brief periods of connected coil 102 excitation. Thus detection of the occurrence of a "zero-crossing" point will have been missed for a significant part of the commutation period, e.g., detection of the "zero-crossing" should have occurred at point 540, but instead detection of the "zero-crossing" can only occur at point 542. A significant time delay (phase shift) from when the "zero-crossing" should have been detected. This may cause instability in commutation control for the motor 100.

Graph 534 also represents approximately a 25 percent PWM drive duty cycle over one electrical cycle at one phase of the motor 100. However, detection accuracy at "zero-crossing" point 542 may be significantly improved over the detection inaccuracy shown in graph 532 by increasing the PWM frequency (number of PWM pulses per second) for only a short time in anticipation of when a "zero-crossing" should occur. Thus the efficiency of the lower average PWM frequency can still be maintained while gaining the advantage of better zero-crossing detection resolution. Once a "zero crossing" has been detected the higher frequency PWM pulses can revert back to the normally used PWM frequency. Also, depending upon the application (use) of the motor 100, detecting "zero crossing" occurrences may not be required for each of the six commutation periods occurring in one electrical cycle. Thereby further reducing the number of times the power transistors 108 and 110 have to be switched on and off during operation of the motor 100. Once acquisition of "zero-crossing" information has been obtained by the digital device 106, the PWM frequency may be increased slightly before the center timing of one or more of the commutation periods, e.g., at 30, 90, 150, 210, 270, and/or 330 electrical degrees. Once a "zero-crossing" has been detected, the PWM frequency can go back to its normal operating frequency. Thus switch losses in the power transistors 108 and 110 are thereby minimized, while being able to accurately detect enough of the "zero-crossing" events to maintain motor commutation timing stability over all operating speeds and PWM duty cycles.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for improving zero-crossing detection in a sensorless brushless direct current motor, said method comprising the steps of:
    generating a first plurality of pulse width modulation (PWM) control pulses at a first number of pulses per second until a certain time interval before a zero-crossing event is anticipated then generating a second plurality of PWM control pulses at a second number of pulses per second, wherein the second plurality of PWM control pulses at the second number of pulses per second is greater than the first plurality of PWM control pulses at the first number of pulses per second;
    detecting a zero-crossing event during the generation of the second plurality of PWM control pulses at the second number of pulses per second in at least one commutation period of an electrical cycle of a sensorless brushless direct current motor by measuring a back electromotive force voltage at an unexcited phase connection of the sensorless brushless direct current motor; and
    returning to generating the first plurality of PWM control pulses at the first number of pulses per second after the zero-crossing event has been detected.

2. The method according to claim 1, wherein the second plurality of PWM control pulses are substantially centered within a respective commutation period when running at the second number of pulses per second.

3. The method according to claim 1, wherein the sensorless brushless direct current motor is a three-phase motor and has six commutation periods in an electrical cycle.

4. The method according to claim 3, wherein each of the commutation periods is 60 degrees in the electrical cycle and the electrical cycle is 360 degrees.

5. The method according to claim 3, wherein the step of detecting a zero-crossing event comprises the steps of:
    applying a positive voltage from a direct current (DC) power source to a first phase of the three-phase motor and a negative voltage from the DC power source to a second phase of the three-phase motor;
    measuring the back electromotive force voltage at a third phase of the three-phase motor when not connected to the DC power source during at least one of the six commutation periods; and
    determining when the first plurality of PWM control pulses are to be generated so as to be substantially centered within respective commutation periods.

6. The method according to claim 5, wherein the first plurality of PWM control pulses are centered in the respective commutation periods at a substantially peak value of the measured back electromotive force voltage.

7. The method according to claim 5, wherein the positive and negative voltages from the DC power source are connected to each pair of phases of the three-phase motor, wherein the back electromotive force voltage is measured at a respective unconnected phase.

8. The method according to claim 7, wherein the step of measuring the back electromotive force voltage at the respective unconnected phase is done with back electromotive force zero-cross detectors, each of the back electromotive force zero-cross detectors is coupled to a respective phase of the three-phase motor.

9. The method according to claim 8, wherein each of the back electromotive force zero-cross detectors comprises a low pass filter and a voltage comparator.

10. A method for improving zero-crossing detection in a sensorless brushless direct current motor, said method comprising the steps of:
generating a plurality of pulse width modulation (PWM) pulses at a first number of pulses per second until a certain time interval before a zero-crossing event is anticipated then generating the plurality of PWM pulses at a second number of pulses per second, wherein the second number of pulses per second is greater than the first number of pulses per second;
determining electrical timing centers for each of a plurality of commutation periods of a sensorless brushless direct current motor by
measuring back electromotive force voltages at each stator coil of the sensorless brushless direct current motor, and
determining from the measured back electromotive force voltages when each of the measured back electromotive force voltages is at substantially a zero-crossing voltage value, wherein the zero-crossing voltage value is about one-half of a voltage value of a direct current power source; and
driving power switching transistors with the plurality of PWM pulses during the plurality commutation periods, wherein the power switching transistors are connected between the stator coils of the sensorless brushless direct current motor and the direct current power source.

11. The method according to claim 10, wherein the sensorless brushless direct current motor is a three-phase sensorless brushless direct current motor and has six commutation periods in an electrical cycle.

12. The method according to claim 11, wherein each of the commutation periods is 60 degrees in the electrical cycle and the electrical cycle is 360 degrees.

13. The method according to claim 11, wherein the step of determining electrical timing centers comprises the steps of:
applying the direct current power source to two stator coils of the three-phase sensorless brushless direct current motor; and
measuring the back electromotive force voltage at a third stator coil of the three-phase sensorless brushless direct current motor while not connected to the direct current power source.

* * * * *